(12) United States Patent
Xueyong et al.

(10) Patent No.: US 7,954,205 B2
(45) Date of Patent: Jun. 7, 2011

(54) CLIP RETAINER

(75) Inventors: Zhang Xueyong, Shanghai (CN); Sun Wei, Shanghai (CN); Li Jun, Shanghai (CN); Liu Haihong, Shanghai (CN); Peng Jun, Shanghai (CN)

(73) Assignees: Yanfeng Visteon Automotive Trim Systems Co, Ltd, Shanghai (CN); Yangfeng Visteon Jinqiao Automotve Trim Systems Co., Ltd, Shanghai (CN)

( * ) Notice: Subject to any disclaimer, the term of this patent is extended or adjusted under 35 U.S.C. 154(b) by 119 days.

(21) Appl. No.: 12/204,881

(22) Filed: Sep. 5, 2008

(65) Prior Publication Data
US 2009/0064467 A1 Mar. 12, 2009

(30) Foreign Application Priority Data

Sep. 11, 2007 (CN) .................... 2007 2 0074530 U

(51) Int. Cl.
*A44B 1/04* (2006.01)
(52) U.S. Cl. ............................ 24/289; 24/297
(58) Field of Classification Search .............. 24/297, 24/453, 458, 457, 289; 403/11, 12, 21, 22, 403/329, 397, DIG. 14; 296/146.7
See application file for complete search history.

(56) References Cited

U.S. PATENT DOCUMENTS

| 4,385,858 | A | * | 5/1983 | Bell ............................ 411/112 |
| 4,550,230 | A | * | 10/1985 | Johnson ...................... 181/199 |
| 5,507,610 | A | * | 4/1996 | Benedetti et al. ............ 411/339 |
| 5,803,651 | A | * | 9/1998 | Saito ............................ 403/329 |
| 6,715,185 | B2 | * | 4/2004 | Angellotti ....................... 24/297 |
| 6,796,760 | B1 | * | 9/2004 | Tanner ......................... 411/107 |
| 7,165,371 | B2 | * | 1/2007 | Yoyasu ......................... 52/716.5 |
| 7,178,855 | B2 | * | 2/2007 | Catron et al. ................ 296/146.7 |
| 7,272,873 | B2 | * | 9/2007 | Nessel et al. .................... 24/297 |
| 2004/0083583 | A1 | * | 5/2004 | Bradley et al. .................. 24/297 |
| 2007/0107174 | A1 | * | 5/2007 | Bordas ............................. 24/664 |
| 2008/0260454 | A1 | * | 10/2008 | Girodo et al. ................... 403/11 |
| 2009/0199371 | A1 | * | 8/2009 | Katoh et al. ..................... 24/458 |
| 2009/0249587 | A1 | * | 10/2009 | Donahue-Yan et al. ......... 24/297 |

* cited by examiner

*Primary Examiner* — Robert J Sandy
*Assistant Examiner* — Michael Lee
(74) *Attorney, Agent, or Firm* — Dickinson Wright PLLC

(57) ABSTRACT

The present invention discloses a clip retainer which includes a top surface having a groove and a bottom surface which has stopping ribs and a barb formed between the stopping ribs. The top surface and the stopping ribs of the bottom surface clamp a flange of a clip. A slope of an inclined plane of the barb in a slide-in direction of the clip is smaller than that of an inclined plane of the barb in a slide-out direction of the clip. Based on the above structure, the clip retainer can meet the function requirements of small slide-in force and large slide-out force of the clip and has a simple structure. Furthermore, the clip retainer can produce repeated insertion and extraction deformation and is very reliable to use.

13 Claims, 2 Drawing Sheets

CLIP RETAINER

CROSS-REFERENCE TO RELATED APPLICATION

This application claims priority to Chinese Patent Application No. 200720074530.6, filed Sep. 11, 2007 which is incorporated herein by reference.

BACKGROUND OF THE INVENTION

1. Field of the Invention

The present invention relates to a clip retainer, and more especially to a clip retainer integrated on an automotive door interior trimming panel body, which is adapted for clip with single-layer tail flange.

2. Description of the Prior Art

Conventional clip retainers are suitable for clip with double-layer flanges. Top surfaces of the clip retainer are locked by the double-layer flanges of the clip. For protecting the clip from sliding out of the clip retainers, some small protrusions are formed on the top surfaces of the clip retainers. However, this kind of structure cannot meet the design requirements of small slide-in force and large slide-out force of the clip, which causes that the force of assembling the clip is great and the assembling is difficult. Or, the slide-out force of the clip is too small so that the clip are easy to slide out of the clip retainers.

Clip retainers for clip with single-layer flanges are less. Because the clip only have single-layer flanges, they can only be clamped by top surfaces and ribs of bottom surfaces of the clip retainers. For avoiding slippage of the clip, General Motors Corporation provides a clip retainer structure which has two knuckle features designed at an opening thereof for avoiding the slippage of the clip. However, the knuckle features are also difficult to meet the design requirements of small slide-in force and large slide-out force of the clip. Furthermore, during insertion and extraction of the clip, the knuckle features are bent repeatedly, so plastic is easy to lose efficacy. Since the clip retainers are integrated on automotive door interior trimming panel bodies, once the clip retainers lose efficacy, the whole door interior trimming panel assemblies have to be abandoned.

SUMMARY OF THE INVENTION

An object of the present invention is to provide a new clip retainer which can solve the problems that conventional clip retainers have complex structures, the operating force of assembling and disassembling of clip is difficult to be controlled, and conventional clip retainer are easy to lose efficacy during assembly and disassembly.

To achieve the above-mentioned object, a clip retainer in accordance with the present invention is disclosed.

The clip retainer includes a top surface having a groove and a bottom surface which has stopping ribs and a barb formed between the stopping ribs; wherein the top surface and the stopping ribs of the bottom surface clamp a flange of a clip, and a slope of an inclined plane of the barb in a slide-in direction of the clip is smaller than that of an inclined plane of the barb in a slide-out direction of the clip.

The clip retainer with the structure described above can meet the requirements of small slide-in force and large slide-out force of the clip. Further, the clip retainer has a simple structure, can produce repeated insertion and extraction deformation, and is very reliable to use.

DETAILED DESCRIPTION OF THE INVENTION

Figure 1:
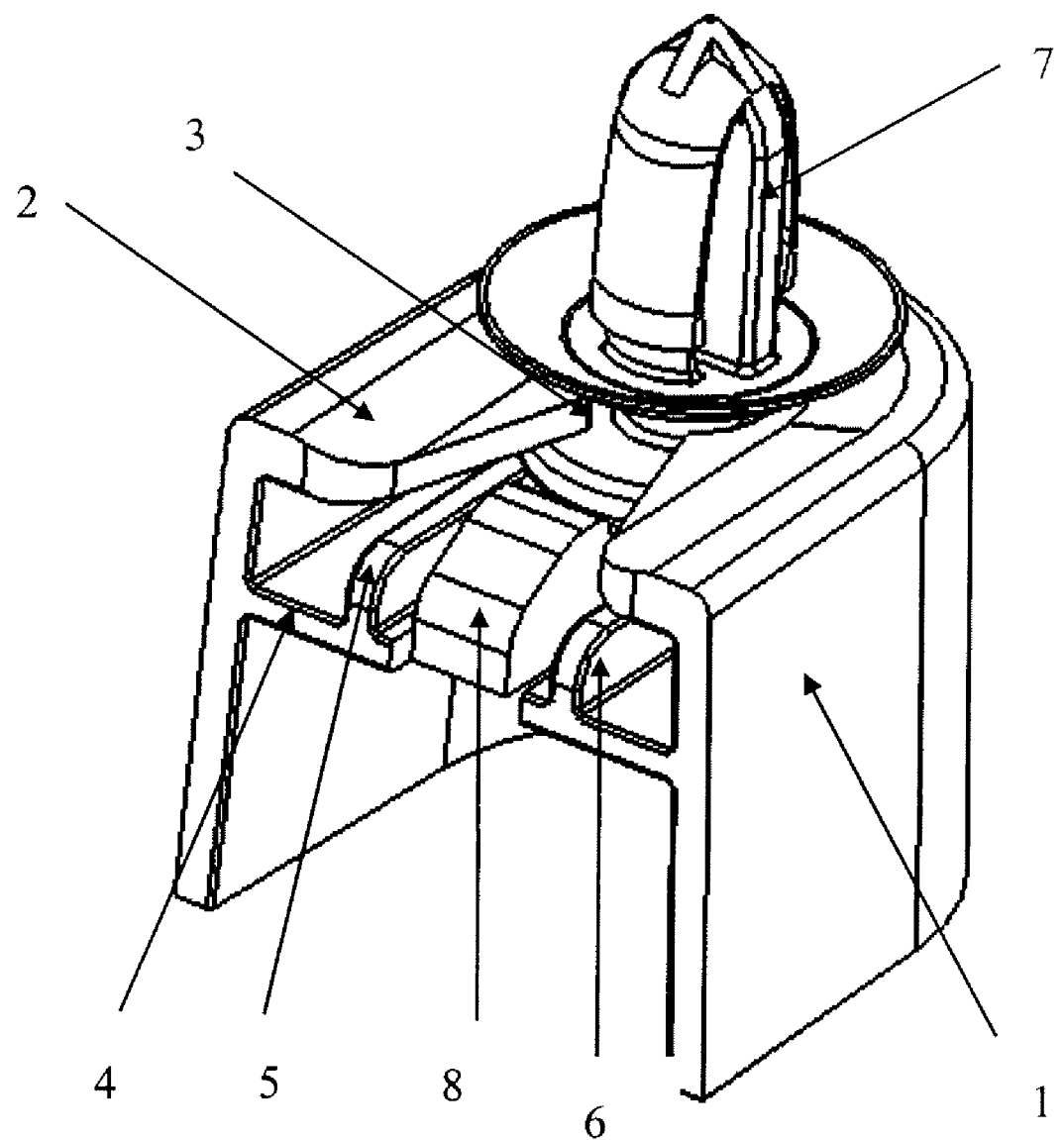
FIG. 1 is a structural schematic view of a clip retainer according to the present invention.
Figure 2:
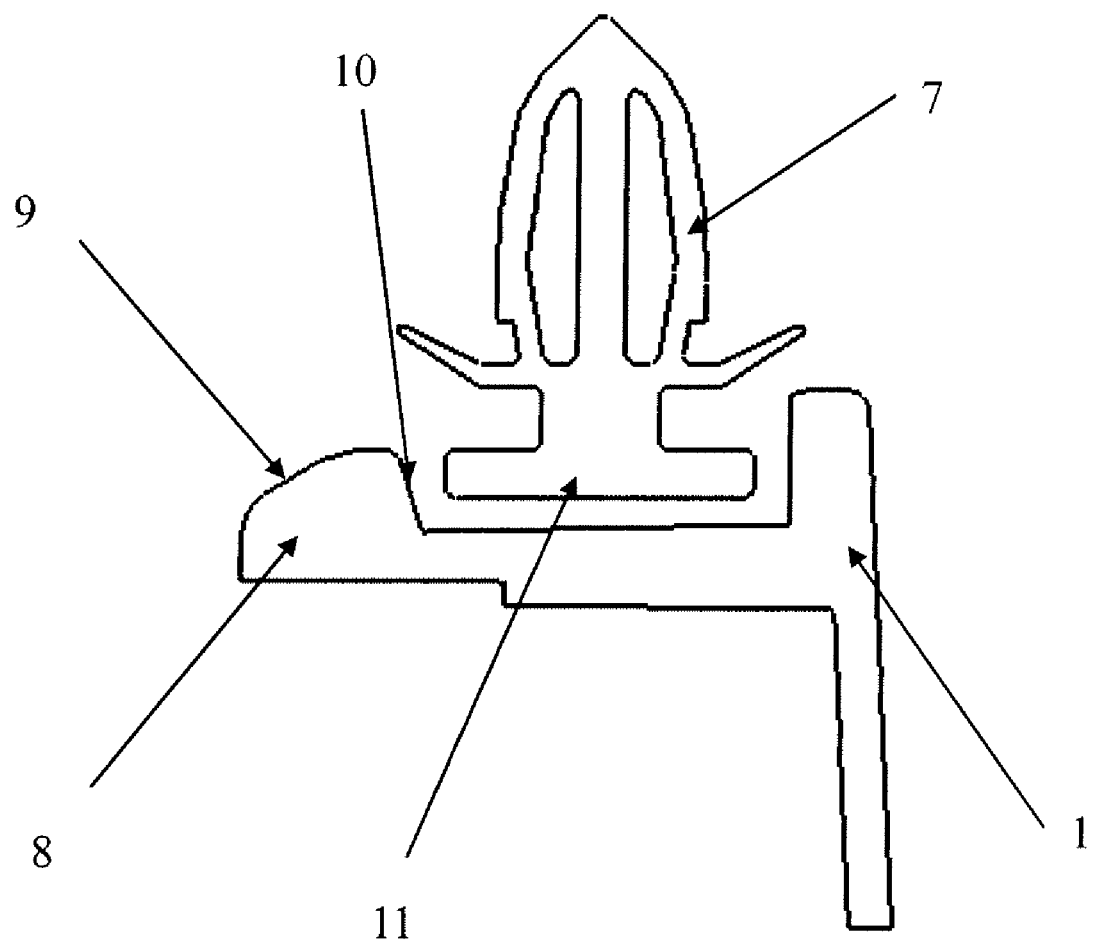
FIG. 2 is a cross-sectional schematic view of the clip retainer according to the present invention.

To further understand functions and features of the present invention, please refer to the detailed description of the preferred embodiment related to the present invention according to FIG. 1 and FIG. 2.

As shown in FIG. 1 and FIG. 2, a clip retainer 1 of the present invention has a groove 3 formed in a top surface 2 thereof and two stopping ribs 5, 6 formed on a bottom surface 4 thereof. Under the combined action of the top surface 2, the groove 3 and the stopping ribs 5, 6, a flange 11 of a clip 7 is clamping in the clip retainer 1.

The clip retainer 1 further has a barb 8 formed between the two stopping ribs 5, 6 on the bottom surface 4 thereof. Since the clip retainer 1 is a plastic member with a certain amount of elastic deformation, the barb 8 can produce proper deformation in the vertical direction in order that the clip 7 can slide into and slide out of the clip retainer 1.

The slope of the inclined plane 9 of the barb 8 in the slide-in direction of the clip is smaller than that of the inclined plane 10 of the barb 8 in the slide-out direction of the clip. The inclined plane 9 in the slide-in direction of the clip retainer has a small slope, so the inclined plane 9 is flat. When the clip 7 slides into the clip retainer 1, the downward component force of the horizontal push-in force causes that the barb 8 produces downward deformation, so the clip 7 can easily slide into the clip retainer 1. The inclined plane 10 of the barb 8 in the slide-out direction of the clip has a large slope, so the inner inclined plane of the barb 8 is very steep, and it needs a very large push-out force to produce a small downward component force which causes that the barb 8 produces downward deformation, thereby the clip 7 is difficult to slide out of the clip retainer 1. Accordingly, the present invention can meet the function requirements of small slide-in force and large slide-out force of the clip 7, so that it is easy to control the operating force of assembling and disassembling the clip 7.

In a preferred embodiment, the slope of the inclined plane 9 of the barb 8 in the slide-in direction of the clip is 30-45 degrees and the slope of the inclined plane 10 of the barb 8 in the slide-out direction of the clip is 70-80 degrees. If the slope of the inclined plane 9 in the slide-in direction of the clip is too small, then the clip 7 is easy to break away. If the slope of the inclined plane 9 in the slide-in direction of the clip is too large, then it needs a large horizontal force to cause that the barb 8 produces downward deformation, so the clip 7 is difficult to slide into the clip retainer 1. Also, if the slope of the inclined plane 10 in the slide-out direction of the clip is too small, then the clip 7 is also easy to break away. If the slope of the inclined plane 10 in the slide-out direction of the clip is too large, it needs a large horizontal force to cause that the barb 8 produces downward deformation, so the clip 7 is difficult to slide out of the clip retainer 1, which may result in the damage of the clip retainer 1.

Furthermore, there should be an interval preformed between the top surface 1 of the clip retainer 1 and the flange 11 of the clip to ensure that the clip 7 has a certain movement value in every direction in the clip retainer 1 for accommodating location tolerance of a door panel assembly. The interval between the top surface 2 of the clip retainer 1 and the flange 11 of the clip 7 has a height of at least 1.5 mm to ensure that the clip has a movement value of 1.5 mm in every direction in the clip retainer 1. During assembly and disassembly, the clip needs to slide in the clip retainer 1, so the reserved interval can help the clip slide more easily and ensure that the clip can be clamped in the clip retainer 1.

The barb 8 is a locking structure which is generally used in injection parts. The barb 8 can produce repeated insertion and extraction deformation and is very reliable to use. Furthermore, the barb 8 has a simple structure and is convenient for manufacture, and solves the problem that conventional clip retainers are easy to lose efficacy during assembly and disassembly. Since the clip retainer is integrated on a door interior trimming panel body, the reliability of the clip retainer effectively reduces production cost of the door interior trimming panel.

The detailed description of the preferred embodiment of the present invention is provided above so that those skilled in the art can implement and make use of the present invention. It will be understood by those skilled in the art that various equivalent changes may be made depending on the claims and the specification of the present invention without departing from the scope of the present invention.

What is claimed is:

1. A clip retainer for allowing for the controlled movement of a flange of a clip to slide into and out of engagement with the clip retainer, comprising:
   a top surface defining a groove for receiving the clip;
   a bottom surface spaced from said top surface;
   a plurality of stopping ribs extending perpendicularly from said bottom surface towards said top surface for clamping the flange of the clip between said plurality of stopping ribs and said top surface; and
   a barb on said bottom surface for deflecting in the vertical direction formed between said stopping ribs and including a slide-in inclined plane having a slide-in slope in a slide-in direction for creating a slide-in force for sliding the flange of the clip into the clip retainer and a slide-out inclined plane having a slide-out slope in a slide-out direction being less than 90 degrees for creating a slide-out force for sliding the flange of the clip out of the clip retainer, a first angle formed between said slide-in inclined plane and said bottom surface and a second angle formed between said slide-out inclined plane and said bottom surface;
   wherein said barb allows for the flange of the clip to be slid into the clip retainer over said slide-in inclined plane and held in place by said barb while allowing the flange of the clip to slide out of the clip retainer over said slide-out inclined plane when a proper slide-out force is applied in said slide-out direction.

2. The clip retainer as set forth in claim 1 wherein said slide-in slope of said slide-in inclined plane of said barb is less than said slide-out slope of said slide-out inclined plane of said barb.

3. The clip retainer as set forth in claim 1 wherein said slide-in force is less than said slide-out force.

4. The clip retainer as set forth in claim 1 wherein said first angle is between 30-45 degrees and said second angle is between 70-80 degrees.

5. A clip retainer assembly for allowing for the controlled movement of a flange of a clip to slide into and out of engagement with a clip retainer, comprising:
   a clip having a flange;
   a clip retainer having a top surface defining a groove for receiving said clip and a bottom surface spaced from said top surface;
   a plurality of stopping ribs extending perpendicularly from said bottom surface towards said top surface for clamping said flange of said clip between said plurality of stopping ribs and said top surface; and
   a barb on said bottom surface for deflecting in the vertical direction formed between said stopping ribs and including a slide-in inclined plane having a slide-in slope in a slide-in direction for creating a slide-in force for sliding said flange of said clip into said clip retainer and a slide-out inclined plane having a slide-out slope in a slide-out direction being less than 90 degrees for creating a slide-out force for sliding said flange of said clip out of said clip retainer, a first angle formed between said slide-in inclined plane and said bottom surface and a second angle formed between said slide-out inclined plane and said bottom surface;
   wherein said barb of said clip retainer allows for said flange of said clip to be slid into said clip retainer over said slide-in inclined plane and held in place by said barb while allowing said flange of said clip to slide out of said clip retainer over said slide-out inclined plane when a proper slide-out force is applied in said slide-out direction.

6. The clip retainer assembly as set forth in claim 5 wherein said slide-in slope of said slide-in inclined plane of said barb is less than said slide-out slope of said slide-out inclined plane of said barb.

7. The clip retainer assembly as set forth in claim 5 wherein said first angle is between 30-45 degrees and said second angle is between 70-80 degrees.

8. The clip retainer assembly as claimed in claim 7, wherein said flange extends between a flange top surface and a flange bottom surface and an interval is provided between said top surface of said clip retainer and said flange top surface of said flange of said clip.

9. The clip retainer assembly as claimed in claim 8, wherein said interval between said top surface of said clip retainer and said flange top surface of said flange of said clip has a height of at least 1.5 mm.

10. The clip retainer assembly as set forth in claim 5 wherein said flange is a single-layer tail flange.

11. The clip retainer as set forth in claim 5 wherein said slide-in force is less than said slide-out force.

12. The clip retainer assembly as claimed in claim 5, wherein said flange extends between a flange top surface and a flange bottom surface and an interval is provided between said top surface of said clip retainer and said flange top surface of said flange of said clip.

13. The clip retainer assembly as claimed in claim 12, wherein said interval between said top surface of said clip retainer and said flange top surface of said flange of said clip has a height of at least 1.5 mm.

* * * * *